US008248626B2

(12) United States Patent
Suzuki

(10) Patent No.: US 8,248,626 B2
(45) Date of Patent: Aug. 21, 2012

(54) INFORMATION PROCESSING APPARATUS FOR SETTING OUTPUT CONDITION TO IMAGES AS OUTPUT TARGETS, AND INFORMATION PROCESSING METHOD AND NON-TRANSITORY COMPUTER-READABLE STORAGE MEDIUM THEREOF

(75) Inventor: Takeshi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/035,856

(22) Filed: Feb. 25, 2011

(65) Prior Publication Data
US 2011/0149346 A1 Jun. 23, 2011

Related U.S. Application Data

(62) Division of application No. 11/607,972, filed on Dec. 4, 2006, now Pat. No. 7,907,300.

(30) Foreign Application Priority Data

Dec. 28, 2005 (JP) ................................. 2005-378625

(51) Int. Cl.
G06F 3/12 (2006.01)
G06K 1/00 (2006.01)
H04N 1/46 (2006.01)
(52) U.S. Cl. ......... 358/1.13; 358/1.9; 358/1.2; 358/537; 270/51
(58) Field of Classification Search ................. 358/1.15, 358/1.9, 1.2, 1.16, 1.18, 537; 270/51
See application file for complete search history.

(56) References Cited

U.S. PATENT DOCUMENTS

| 6,535,298 | B2 | 3/2003 | Winter et al. |
| 6,744,529 | B2 | 6/2004 | Winter et al. |
| 6,956,671 | B2 | 10/2005 | Monty et al. |
| 2001/0040685 | A1 | 11/2001 | Winter et al. |
| 2002/0105669 | A1 | 8/2002 | Watanabe et al. |
| 2003/0161000 | A1 | 8/2003 | Suzuki |
| 2004/0041913 | A1* | 3/2004 | Takasumi et al. .......... 348/207.2 |
| 2004/0190059 | A1 | 9/2004 | Winter et al. |
| 2008/0094650 | A1 | 4/2008 | Suzuki |

FOREIGN PATENT DOCUMENTS

| JP | 2002273973 | 9/2002 |
| JP | 2002305701 | 10/2002 |

* cited by examiner

Primary Examiner — Thomas Lett
(74) Attorney, Agent, or Firm — Fitzpatrick, Cella, Harper & Scinto

(57) ABSTRACT

There are provided an image processing apparatus and its control method in which sheet size/type and options can be set every image without reducing the number of images written onto one index sheet. The options include image processes such as addition of a date, VIVID-photo, noise cancellation, automatic photograph correction, face-brightening correction, red-eye correction, etc. Only for the user who desires, a sheet SH2 is used in addition to a conventional index sheet. In the sheet SH2, there can be set every image the sheet size/type and the options of the image processes such as addition of a date, VIVID-photo, noise cancellation, automatic photograph correction, face-brightening correction, red-eye correction, etc.

6 Claims, 9 Drawing Sheets

FIG. 4
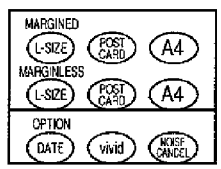 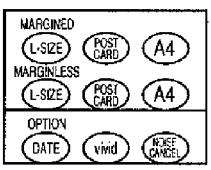 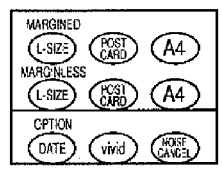 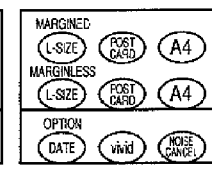
a. jpg/ABC400  b. jpg/ABC400  c. jpg/ABC400  d. jpg/ABC400
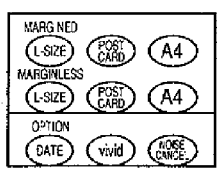 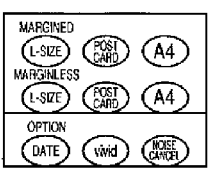 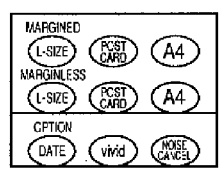 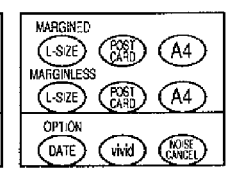
aa. jpg/ABC600  ab. jpg/ABC600  1. jpg/ABC800  2. jpg/ABC800

FIG. 5
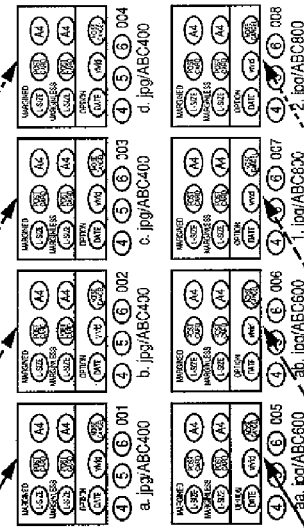
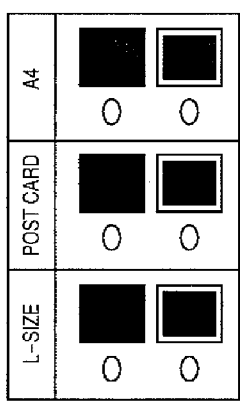
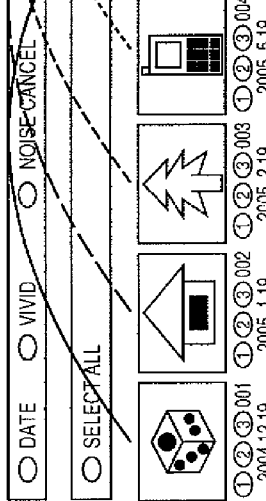
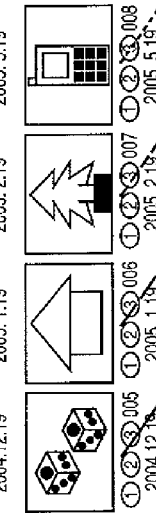

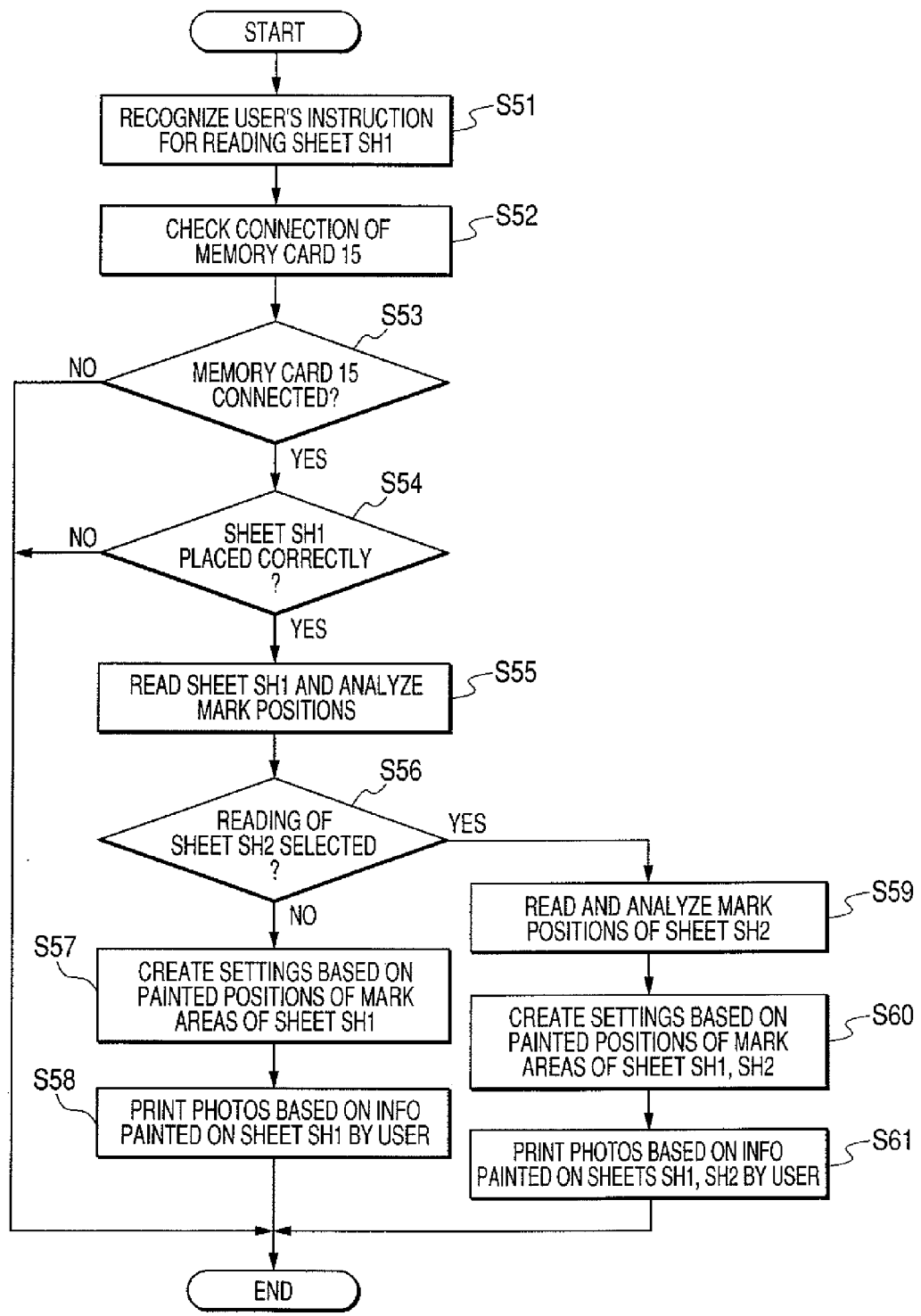

INFORMATION PROCESSING APPARATUS FOR SETTING OUTPUT CONDITION TO IMAGES AS OUTPUT TARGETS, AND INFORMATION PROCESSING METHOD AND NON-TRANSITORY COMPUTER-READABLE STORAGE MEDIUM THEREOF

This application is a divisional application of U.S. patent application Ser. No. 11/607,972, filed Dec. 4, 2006, now allowed, the contents of which are incorporated herein by reference.

BACKGROUND OF THE INVENTION

1. Field of the Invention

The invention relates to an image processing apparatus and a control method of the image processing apparatus.

2. Description of the Related Art

Hitherto, a digital camera is an apparatus which is used as a peripheral apparatus of a personal computer. However, in recent years, the number of cases where the user who does not have the personal computer purchases the digital camera and uses it has been increasing. Therefore, a demand to directly print data of the digital camera by a home-use printer or the like without using the personal computer is rising.

As a method of directly printing digital images in a memory card or the like without using the personal computer, a method whereby the user directly inserts the memory card in which the digital images have been stored into a recording apparatus and operates an operation unit of the recording apparatus, thereby printing the digital images is used.

However, it is a present situation that, among the home-use recording apparatuses, there are many recording apparatuses in which the operation unit is small or the number of keys is small, there is a limitation in a size of viewer which is necessary upon image selection, and it is more difficult to operate and display as compared with the personal computer.

Particularly, when the images in the memory card are printed, although there are many items to be set such as browsing of the images, designation of image numbers, designation of the number of print copies of the image to be printed, designation of print resolution, and the like, many keys are not arranged in the operation unit of the recording apparatus and the operation is liable to be complicated.

Therefore, as a method of printing the image data in the memory card without using the personal computer, hitherto, there has been used a method whereby the user uses a multi-function apparatus having both of a reading apparatus and the recording apparatus, thereby using an index sheet for navigating the printing of the image data.

According to such a conventional method, first, the images as print candidates in the memory card are collected to an index and are marked. Further, the index sheet to which marks for enabling the setting items such as print resolution and the like to be instructed have been added is recorded by the multi-function apparatus.

In the above index sheet, the user marks the images to be recorded and the recording settings. Since such a method is a method similar to a procedure for an additional print of photograph, it is an operating method which can be intuitively and easily understood by the user.

After that, a reading unit of the multi-function apparatus reads the index sheet written by the user and the multi-function apparatus prints photographs on the basis of a result of the writing by the user. By using such a method, when the images are printed without using the personal computer, the complicated image printing operation performed by an operation panel can be easily executed (for example, refer to Japanese Patent Application Laid-open No. 2002-273973 and Japanese Patent Application Laid-open No. 2002-305701).

In the foregoing conventional image printing method using the index sheet, since there is a limitation in a space of the surface of the index sheet, the item which can be set every image is limited to only the number of print sheets. Therefore, as for setting items such as sheet size and sheet type and setting items about image processes such as addition of a date, VIVID-photo, noise cancellation, automatic photograph correction, face-brightening correction, red-eye correction, and the like, such marks as to validate the settings for all images recorded in the index sheet are printed onto the index sheet. There is, consequently, a problem in which the setting items about the image processes and the like cannot be individually set every image.

With respect to information of each image, since there is also a limitation in the space of the surface of the index sheet, the date and the like of the creation of each image cannot be printed onto the index sheet. As information of each image, there are information about the number of pixels, compressing mode, a model name of the apparatus, an aperture value, position information such as longitude, latitude, and the like, a color space, and the like.

SUMMARY OF THE INVENTION

It is an object of the invention to provide an image processing apparatus which can set a sheet size, a sheet type, and options every image without reducing the number of images which are printed onto one index sheet and to provide a control method of the image processing apparatus.

The "options" mentioned above denote image processes such as addition of the date, VIVID-photo, noise cancellation, automatic photograph correction, face-brightening correction, red-eye correction, and the like.

It is another object of the invention to provide an image processing apparatus which can select images to be printed with reference to detailed information of the images and to provide a control method of the image processing apparatus.

The "detailed information regarding each image" denotes the number of pixels, the compressing mode, the model name of the apparatus, the aperture value, the position information (GPS) such as longitude, latitude, and the like, the color space, and the like.

According to the invention, in addition to the conventional index sheet (hereinbelow, referred to as a "sheet SH1"), a sheet SH2 is used only for the user who desires it.

In the "sheet SH2", the sheet size, the sheet type, and the options of the image processes such as addition of the date, VIVID-photo, noise cancellation, automatic photograph correction, face-brightening correction, red-eye correction, and the like can be set every image.

The "sheet SH2" is a sheet having the detailed information regarding each image such as the number of pixels, compressing mode, model name of the apparatus, aperture value, position information of the longitude, latitude, and the like, color space, and the like.

According to the invention, since the sheet SH1 is used when the user prints the photographs by using the index sheet in a manner similar to the conventional one, there is such an effect that the number of print copies of each image can be freely set. With respect to the sheet size, the sheet type, and the options of the image processes such as addition of the date, VIVID-photo, noise cancellation, automatic photograph correction, face-brightening correction, red-eye correction, and the like, there is such an effect that the same values can be set for all of the images to be printed.

Further features of the present invention will become apparent from the following description of exemplary embodiments with reference to the attached drawings.

BRIEF DESCRIPTION OF THE DRAWINGS

FIG. 4 is a diagram showing an example of a sheet SH2 which is used in the first embodiment.

FIG. 5 is a diagram showing a positional relation of setting items of each image between the sheet SH1 printed on the obverse side and the sheet SH2 printed on the reverse side in the first embodiment.

FIG. 10 is a flowchart showing the operation for scanning the photo index sheets and printing photographs in the first embodiment.

DESCRIPTION OF THE EMBODIMENTS

Figure 1:
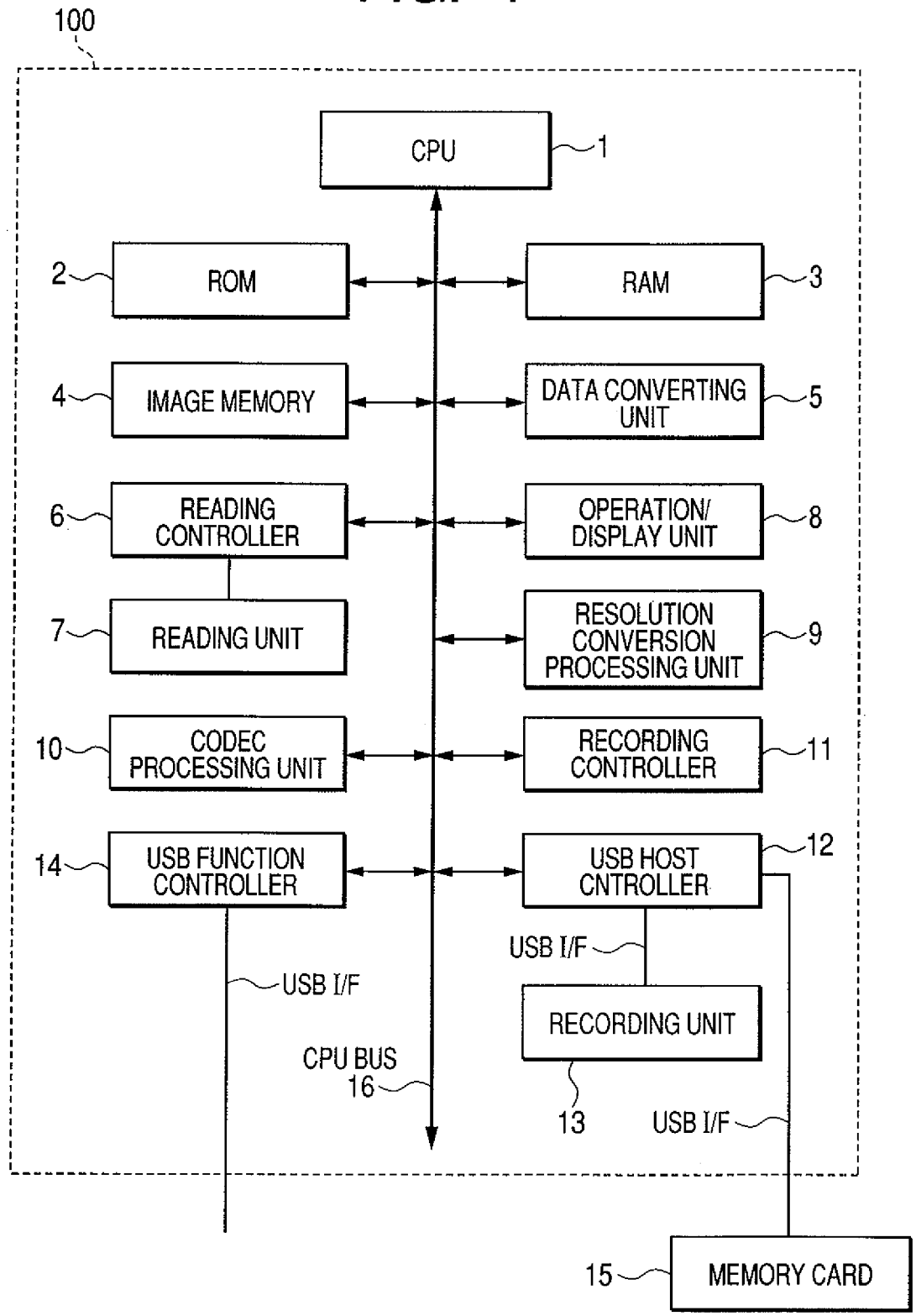
FIG. 1 is a block diagram showing a schematic construction of a multi-function apparatus 100 constructing an image processing system according to a first embodiment of the invention.

FIG. 1 is a block diagram showing a schematic construction of a multi-function apparatus 100 constructing an image processing system according to a first embodiment of the invention.

The multi-function apparatus 100 has: a CPU 1; a ROM 2; a RAM 3; an image memory 4; a data converting unit 5; a reading controller 6; a reading unit 7; an operation/display unit 8; a resolution conversion processing unit 9; a codec processing unit 10; and a recording controller 11. The multi-function apparatus 100 also has: a USB host controller 12; a recording unit 13; a USB function controller 14; and a CPU bus 16.

A memory card 15 is connected to the USB host controller 12.

The CPU 1 is a system controller and controls the whole multi-function apparatus 100.

Control programs which are executed by the CPU 1, data tables, and fixed data such as an installed operating system (OS) program and the like have been stored in the ROM 2. Each of the control programs stored in the ROM 2 makes software execution control such as scheduling, task switch, interrupting process, or the like under management of the installed OS stored in the ROM 2.

The RAM 3 is constructed by an SRAM (Static Random Access Memory) or the like which needs a backup power source and holds data by a primary battery for data backup (not shown). Program control variables and the like in which the user does not want erasure of data are stored in the RAM 3. A memory area for storing set values registered by the user, management data of the multi-function apparatus 100, and the like is provided in the RAM 3.

The image memory 4 is constructed by a DRAM (Dynamic Random Access Memory) or the like and stores image data. A partial area is assured as a work area in the image memory 4 in order to execute the software process.

The data converting unit 5 executes conversion of the image data such as analysis of a PDL (Page Description Language) or the like, CG (Computer Graphics) development of character data, or the like.

The reading unit 7 is constructed by a CIS image sensor (contact type image sensor), a CCD image sensor, or the like and optically reads an original document. The reading controller 6 controls the reading unit 7. The reading controller 6 controls so as to execute various image processes such as binarizing process, halftone process, and the like to an image signal obtained by converting the electric image data read by an image process controller (not shown) and output the high-precise image data. In the first embodiment, the reading controller 6 and the reading unit 7 correspond to both of a sheet reading control system for reading the image while conveying the original and a book reading control system for scanning the original fixed on a copyboard (original setting base plate).

The operation/display unit 8 is constructed by: an operation unit for allowing the user to execute various kinds of operations by using various keys; the various keys; an LED (Light Emitting Diode); and a display unit which is constructed by an LCD (Liquid Crystal Display) or the like and displays various inputting operations which are executed by the user and an operation situation, a status situation, and the like of the multi-function apparatus 100. The operation/display unit 8 will be explained in detail hereinafter in conjunction with FIG. 2.

The resolution conversion processing unit 9 makes resolution conversion control of a mutual conversion between image data of the millimeter system and image data of the inch system. In the resolution conversion processing unit 9, an enlarging/reducing process of the image data can be also executed.

The codec processing unit 10 mutually encodes and decodes the image data which is handled in the multi-function apparatus 100 and executes the enlarging/reducing process. MH, MR, MMR, JBIG, JPEG, or the like can be used as an encoding system.

The recording controller 11 converts the image data to be printed into the high-precise image data by executing various kinds of image processes such as smoothing process, recording concentration correcting process, color correction, and the like to the image data through the image processing controller (not shown) and outputs the converted image data to the USB host controller 12. The recording controller 11 periodically obtains status information data of the recording unit 13 by controlling the USB host controller 12.

The USB host controller 12 is a controller for making communication by a protocol which has been predetermined by the USB communication standard. The USB communication standard is a standard in which bidirectional data communication can be made at a high speed and a plurality of hubs or functions (slaves) can be connected to one host (master). The USB host controller 12 has a function of the host in the USB communication.

The recording unit 13 is a recording apparatus which is controlled by a dedicated CPU (not shown) and constructed by a laser beam printer (LBP) or an ink-jet printer. The recording unit 13 prints color image data or monochromatic image data received through a USB interface onto a print member. Communication is made between the recording unit 13 and the USB host controller 12 by the protocol which has been predetermined by the USB communication standard, and the recording unit 13 has a function of the function (slave). In the first embodiment, a one-to-one correspondence connecting form is used in the USB communication of the recording function.

The USB function controller 14 makes the communication control of the USB interface and makes protocol control in accordance with the USB communication standard. The USB function controller 14 converts data from a USB function control task which is executed by the CPU 1 into a packet and transmits the USB packet to an external PC (not shown). On the contrary, the USB function controller 14 also converts a USB packet from the external PC into data and transmits the data to the CPU 1.

The memory card 15 is a data storing medium and can be connected to the multi-function apparatus 100. Although the memory card 15 and the multi-function apparatus 100 are connected by the USB interface in the first embodiment, they can be also connected by another method.

The foregoing component elements 1 to 6, 8 to 12, and 14 are mutually connected through the CPU bus 16 which is managed by the CPU 1.

Figure 2:
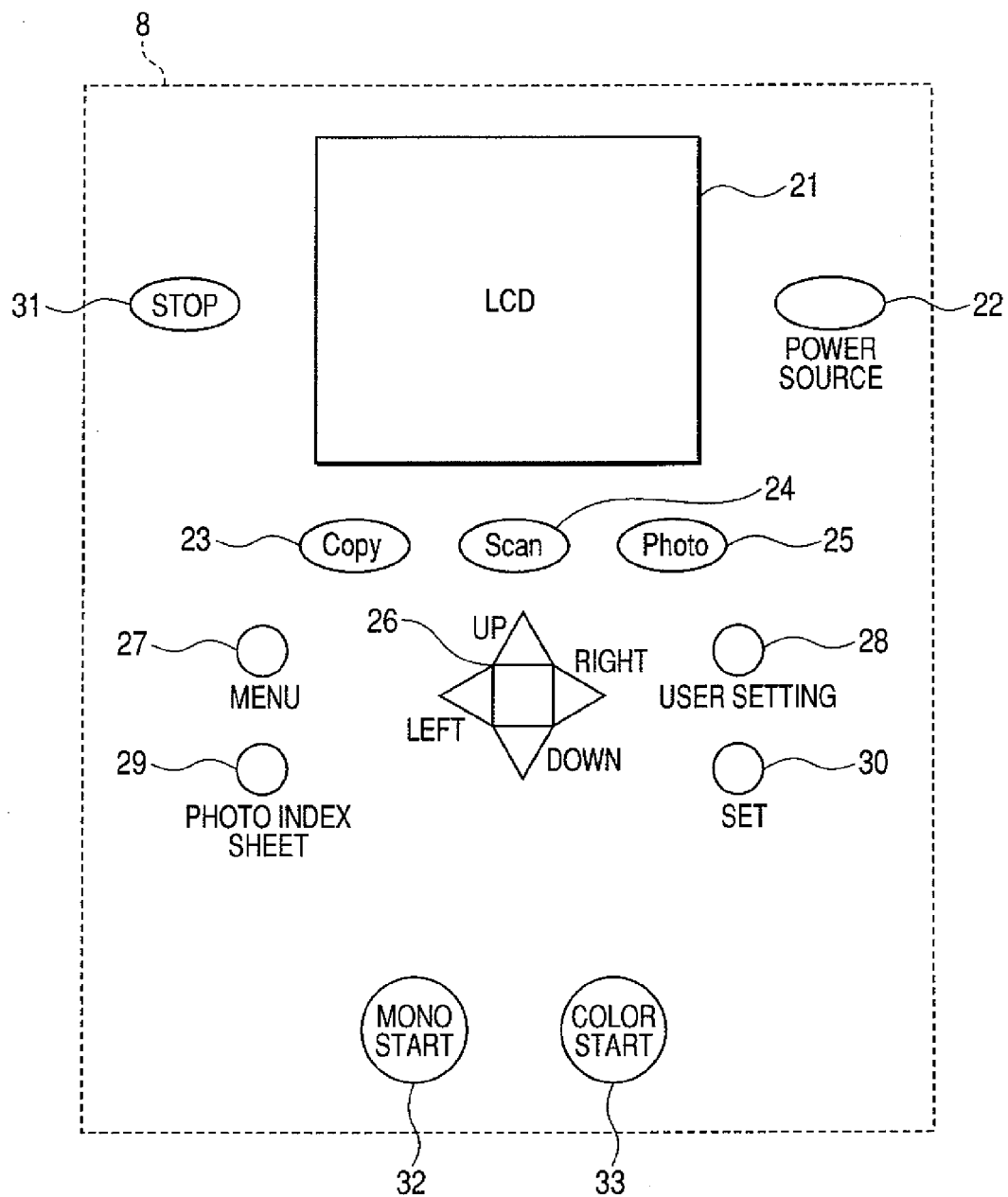
FIG. 2 is a diagram showing a specific example of an operation/display unit 8 provided for the multi-function apparatus 100.

FIG. 2 is a diagram showing a specific example of the operation/display unit 8 provided for the multi-function apparatus 100.

The operation/display unit 8 has: an LCD viewer 21; a power source key 22; a copy mode key 23; a scan mode key 24; a photo mode key 25; an up/down/right/left key 26; a menu key 27; and a user setting key 28. The operation/display unit 8 also has: a photo index sheet key 29; a set key 30; a stop key 31; a mono (monochromatic) start key 32; and a color start key 33.

The LCD viewer 21 is a display for displaying a message, an operation prompt, and various kinds of information. The power source key 22 is a key for turning on/off a power source of the multi-function apparatus 100.

The copy mode key 23 is a key for setting the multi-function apparatus 100 into a copy-ready mode. By depressing the copy mode key 23, the user can set the multi-function apparatus 100 into a copy mode.

The scan mode key 24 is a key for setting the multi-function apparatus 100 into a scan-ready mode. By depressing the scan mode key 24, the user can set the multi-function apparatus 100 into a scan mode.

The photo mode key 25 is a key for setting the multi-function apparatus 100 into a mode in which the digital images in the memory card 15 or the digital images which are transmitted from a digital camera (not shown) connected to the USB host controller 12 can be directly printed. By depressing the photo mode key 25, the user can set the multi-function apparatus 100 into a photo mode.

The up/down/right/left key 26 is a key which is used when the user selects a desired one of a plurality of selection items such as menu, user setting, and the like.

The menu key 27 is a key for displaying items to set the set values upon execution such as direct printing from a copy or a card and the like. By depressing the menu key 27, the user can display the setting items for execution onto the LCD viewer 21, select a desired one of the setting items by the up/down/right/left key 26, and set it by the set key 30.

The user setting key 28 is a key for displaying a display screen to register the set values which are set by the user into the multi-function apparatus 100. By depressing the user setting key 28, the user can display the user setting items onto the LCD viewer 21, select a desired one of the user setting items by the up/down/right/left key 26, and set it by the set key 30.

The photo index sheet key 29 is a key for shifting the display to a display screen to print the sheet onto the photo index sheet or read the photo index sheet. When the user depresses the photo index sheet key 29 in the state where the memory card 15 has been inserted into the multi-function (or multiplex) apparatus 100, the display is shifted to a display screen for printing a sheet SH1 or a sheet SH2, which will be explained hereinafter, or a display screen for instructing the reading. After that, by depressing the up/down/right/left key 26 and the set key 30, the printing operation or the reading operation is instructed. The sheet SH1 will be explained in detail with reference to FIG. 3 and the sheet SH2 will be explained in detail with reference to FIG. 4.

The set key 30 is a key for deciding the selected item. The stop key 31 is a key for stopping the operation such as facsimile transmission/reception, copy, or the like.

The mono start key 32 is a key for starting the monochromatic copy, monochromatic scan, or the like. The color start key 33 is a key for starting the color copy, color push scan, or color image printing.

Figure 3:
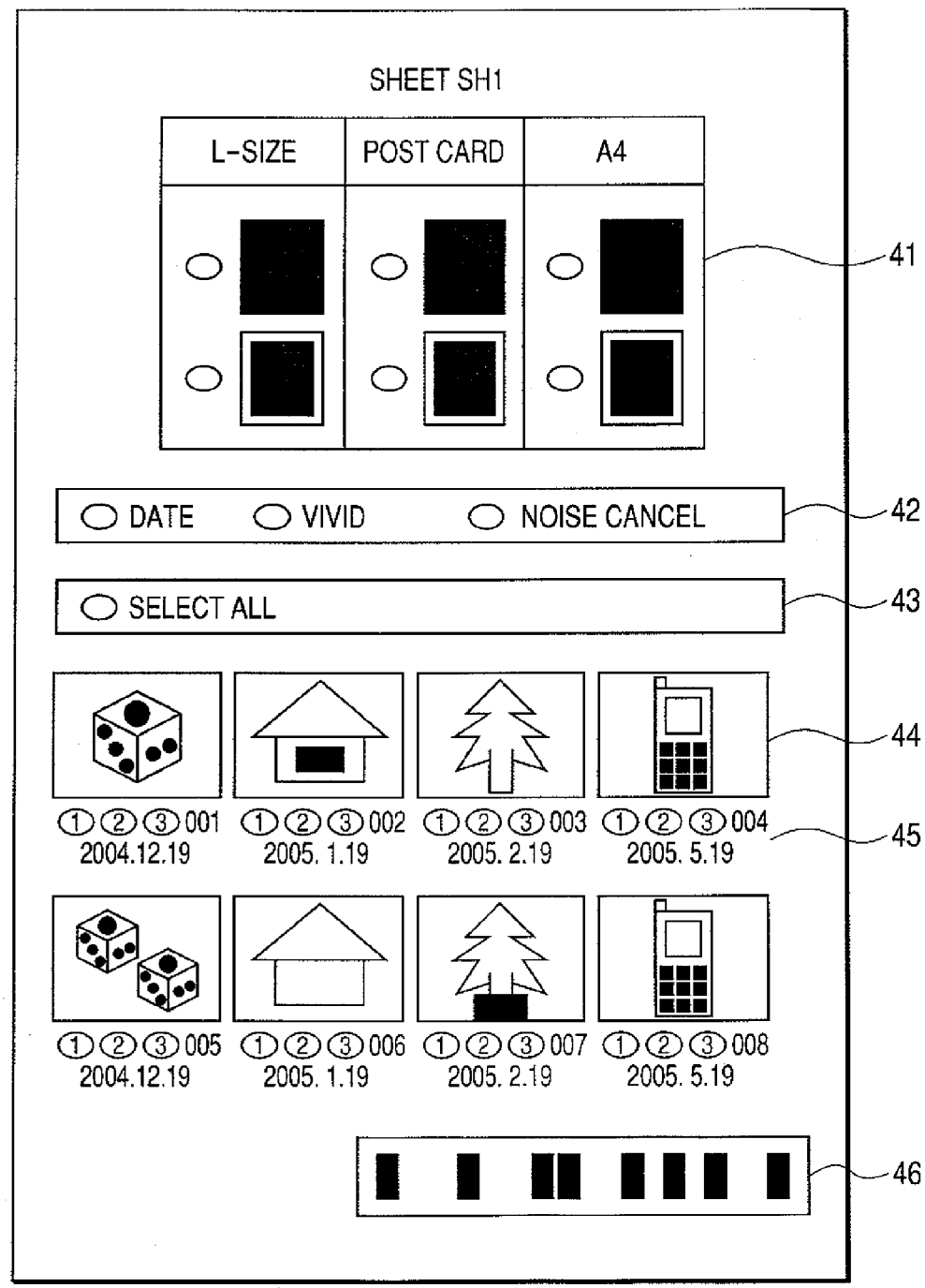
FIG. 3 is a diagram showing an example of a sheet SH1 which is used in the first embodiment.

FIG. 3 is a diagram showing an example of the sheet SH1 which is used in the first embodiment.

The sheet SH1 is a sheet which is outputted by depressing the photo index sheet key 29 and instructing the printing and is a sheet for specifying the target which is printed by the multi-function apparatus 100.

When the user instructs to print the photo index sheet through the operation/display unit 8, the image data is read out of the memory card 15 inserted in the multi-function apparatus 100 and the sheet SH1 is formed.

In this instance, on the sheet SH1, the user adds a mark to each of the images which the user wants to set them to print targets. The user writes an instruction to photo-print the images in the memory card onto the sheet SH1 and allows it to be inputted to the multi-function apparatus 100, thereby realizing the photo printing.

In the case where the user writes the instruction to photo-print the images in the memory card 15 onto the sheet SH1, the marks of the images to be printed are painted, so that the print setting is made.

The sheet SH1 on which signs have been added to the marks corresponding to the images to be photo-printed is placed to the reading unit 7 and the photo index sheet key 29 is depressed. By issuing a reading instruction by using the operation/display unit 8, the sheet SH1 is read. Upon reading of the sheet, a state of the mark is discriminated, the image to be photo-printed is recognized, and it is photo-printed.

The sheet SH1 constructs the following mark areas which are valid to all images-whose printing is desired.

Mark area 41 to select the sheet size/type
Mark area 42 to set the image processes to all of the images
Mark area 43 to set all of the images to the print targets
Mark areas 44 and 45 to select the images
Sheet code 46

The mark areas 41, 42, and 43 are portions to decide the print settings upon photo-printing. When each item is set, by painting the items which are set by the user, the painted items are set.

In the mark area 41, the setting which is common to all of the images to be printed is made with respect to a printing method regarding the following items: a sheet size such as L-size, 2L-size, post card, B5, A4, or the like; a sheet type such as photograph paper or plain paper; margined/marginless; and the like.

In the mark area 42, the option setting which is common to all of the images to be printed is made with respect to the options of the image corrections such as addition of the date, VIVID-photo, noise cancellation, automatic photograph correction, face-brightening correction, red-eye correction, and the like.

The mark area 43 is a mark which is painted in the case of selecting all of the images displayed on the sheet SH1.

The mark areas 44 and 45 are portions for selecting desired images (images whose photo-printing is demanded) among the images displayed on the sheet SH1. The mark is added every image to the mark areas 44 and 45. By painting the mark area 45 corresponding to the images whose photo printing is demanded, it is shown that the images corresponding to the painted marks have been selected. The mark area 45 also includes the contents showing the number of print copies and the user can select the number of print copies for each image.

That is, three marks are written under one image in FIG. 3. By painting the left mark, center mark, and right mark among those three marks, the corresponding images can be photo-printed by one, two, and three print copies, respectively.

As information serving as a reference when the user selects the images, the date when the picture has been photographed and the image numbers unconditionally indicating the selectable images are written on the sheet.

The sheet code 46 is a code including the information of the sheet SH1. When the reading unit 7 reads the sheet SH1, the information of the sheet SH1 is read therefrom and the multi-function apparatus 100 can know the information of the image on the sheet. Consistency between the information of the sheet SH1 read by the reading unit 7 and the information in the memory card 15 can be held by the sheet code 46.

FIG. 4 is a diagram showing an example of the sheet SH2 which is used in the first embodiment.

The sheet SH2 is outputted subsequently to the sheet SH1 when the user instructs the printing by depressing the photo index sheet key 29. The sheet SH2 is a sheet for making the individual detailed setting of each image which cannot be set by the sheet SH1.

When the print instruction of the photo index sheet is issued through the operation/display unit 8, first, the sheet SH1 is outputted and, thereafter, the sheet SH2 is outputted to the reverse side of the sheet SH1.

The user writes detailed instructions of each image to photo-print the images in the memory card 15 onto the sheet SH1 and the sheet SH2 and inputs them into the multi-function apparatus 100, thereby realizing the photo printing.

The sheet SH2 constructs the following mark areas for individually making detailed setting every image.

Mark area 51 to select the sheet size/type
Mark area 52 to set the image processes
Image information area 53 showing detailed image attributes The mark area 51 is a mark for making the setting with respect to a printing method regarding the following items: the sheet size such as L-size, 2L-size, post card, B5, or A4; the sheet type such as photograph paper or plain paper; margined/marginless; and the like. If the mark area 41 has been marked, the values which have individually been set every image in the mark area 51 are preferentially used with respect to the individual sheet size/type.

The mark area 52 is an area for making the setting every image with respect to the options of the image corrections such as addition of the date, VIVID-photo, noise cancellation, automatic photograph correction, face-brightening correction, red-eye correction, and the like. If the mark area 42 has been marked, the relevant option items are cancelled. If the setting is not made in the mark area 51 but the setting has been made only in the mark area 42, this setting is valid.

In the image information area 53, the user can see the more detailed information of each image. Although file names and model names of the apparatuses which took the pictures have been printed in FIG. 4, the number of pixels, the compressing mode, the aperture value, the position information such as longitude, latitude, and the like, the color space, and the like can be also printed as other items.

In the image information area 53, there is an item for printing four, five, and six images every image. Although only one, two, and three images can be selected in the mark area 45, a setting width of the number of print copies can be increased by using the image information area 53.

Further, since the common number which is counted up from 001 has been added to each of the mark area 45 and the image information area 53, even if the sides of the sheets become the obverse and reverse sides, such a situation that the setting items of the relevant image cannot be found does not occur.

FIG. 5 is a diagram showing a positional relation of the setting items of each image between the sheet SH1 printed on the obverse side and the sheet SH2 printed on the reverse side in the first embodiment.

In both of the sheets SH1 and SH2, since the image number of the upper left image is equal to 001, the image number of the lower right image is equal to 008, and the relative positional relations on the sheets are identical, the user can intuitively recognize which setting item corresponds to which image.

The operation for instructing the target images to be photo-printed or the like by using the photo index sheet in the first embodiment will now be described.

Figure 6:
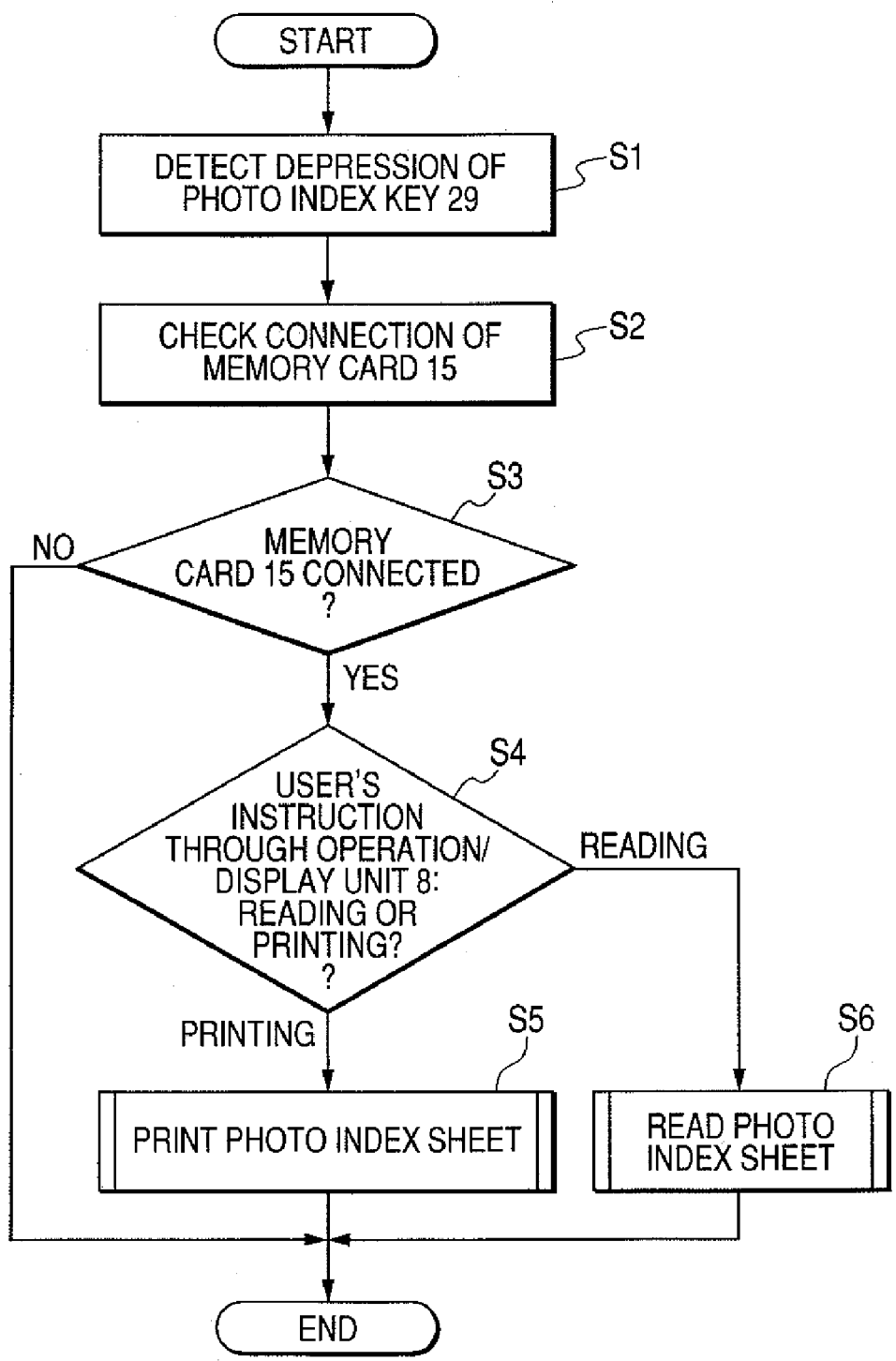
FIG. 6 is a flowchart showing the operation for instructing targets to be photo-printed or the like by using photo index sheets in the first embodiment.

FIG. 6 is a flowchart showing the operation for instructing the targets to be photo-printed or the like by using the photo index sheets in the first embodiment.

To print the photo index sheet, the photo index sheet key 29 in the operation/display unit 8 is depressed.

First, if the depression of the photo index sheet key 29 is detected through the operation/display unit 8 in step S1, the connection of the memory card 15 is confirmed in S2.

Whether or not the memory card 15 has been connected is discriminated in S3. If the memory card 15 is not connected, the printing cannot be performed and the processing routine is finished. If the memory card 15 has been connected, the images to be photo-printed are designated by using the up/down/right/left key 26, the set key 30, and the like in the operation/display unit 8 and whether or not the sheet SH2 is printed is selected in step S4. If the images stored in the memory card 15 has been sorted in order of the photographing time and date, the images are instructed in the sorting order on the basis of the numbers (Nos.) added to the images. For example, No. 10 is displayed by the up/down/right/left key 26 and set by operating the set key 30. Further, No. 2 is displayed by using the up/down/right/left key 26 and set by operating the set key 30. By those operations, the designation regarding the images of Nos. 10 to 2 stored in the memory card 15 is completed.

Whether or not the sheet SH2 is printed on the reverse side of the sheet SH1 is designated.

After those operations were finished and the setting of the photo printing by the sheet SH1 was finished, the processing routine advances to S5. In S5, the set contents of the photo print are printed only to the sheet SH1 or to both of the sheets SH1 and SH2. The printing in this instance will be explained in detail with reference to FIG. 7.

As a method of selecting the images to be printed to the photo index sheet, besides the method of designating the range on the basis of the numbers (Nos.) added to the images as mentioned above, a method of designating the photographing time/date and selecting the photographs on that time/date or the like can be also used. A method of designating an arbitrary number of photographs in order from the latest photograph on the basis of the photographing time/date and selecting the photographs may be used.

If the reading of the photo index sheet is set in S4, whether or not the sheet SH2 is read is designated. In S6, only the sheet SH1 is read or both of the sheets SH1 and SH2 are read and the photographs are printed in accordance with the setting contents of the printing of the read photographs. The reading of the photo index sheet and the printing of the photographs will be described in detail with reference to FIG. 9.

Although the printing and the reading of the photo index sheet are executed through the operation/display unit 8 as mentioned above, the printing and the reading of the photo index sheet can be also executed by using means other than the operation/display unit 8.

Although whether or not the processes of the sheet SH2 are executed is selected upon printing and upon reading in the first embodiment, the processes for printing and reading of the sheet SH2 can be also certainly executed.

The operation for printing the sheet SH1 and the sheet SH2 in the first embodiment will now be described.

Figure 7:
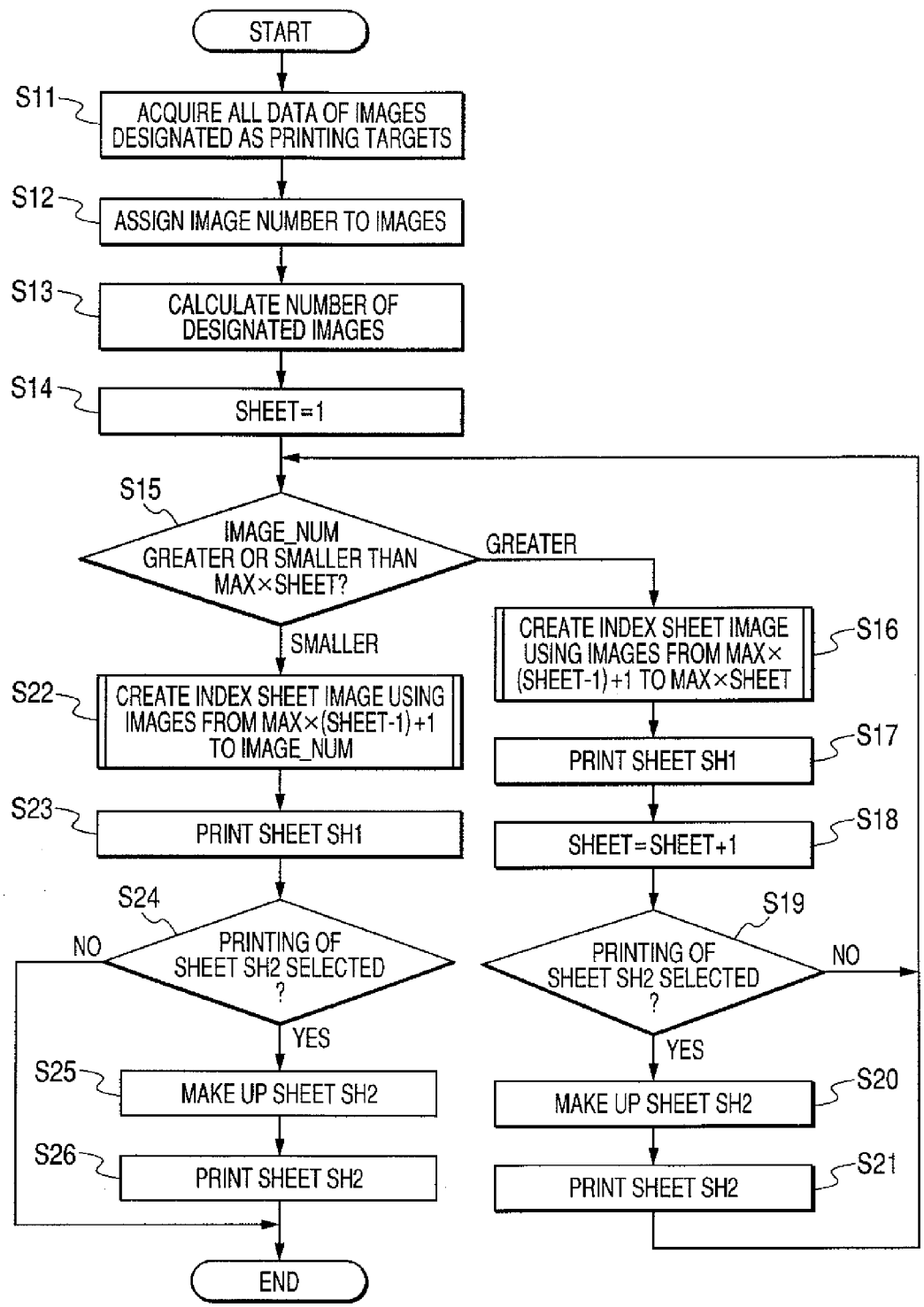
FIG. 7 is a flowchart showing the operation for printing the sheet SH1 and the sheet SH2 in the first embodiment.

FIG. 7 is a flowchart showing the operation for printing the sheet SH1 and the sheet SH2 in the first embodiment.

First, the information of the images designated by the user as print targets in S4 is obtained in S11.

In the first embodiment, since the image data in the memory card 15 is set to the targets of the photo print, the image data is obtained from the memory card 15. In this case, to raise a print speed of the sheet SH1, an image of a thumbnail is obtained as image data and displayed on the sheet SH1. In S12, the image numbers are assigned with respect to the images. The assigned image numbers are numbers which are internally used by the multi-function apparatus 100 when the images are selected.

The user does not need to know the assigned image numbers at all. It is sufficient that the user merely executes the operation to paint the necessary areas of the sheets SH1 and SH2. Thus, the reading unit 7 reads the painted areas.

In S13, the number of images designated by the user as print targets of the sheet is calculated. The number of designated images is assumed to be "IMAGE_NUM". When the user designates the number of images, there are various designating methods of the number of images: for example, it is designated by the number of images; it is designated by the date; all of the images are designated; and the like. If the number of images is not designated, the number of images to be set as designation targets cannot be recognized. Therefore, it is necessary to automatically change the number of sheets in accordance with the number of images. It is, therefore, necessary to designate the number of images.

In S14, a sheet page variable of the sheet to be printed is initialized. The sheet page variable (the number of sheets) is assumed to be "SHEET". Since the sheet SH1 starts with one sheet, the initialization value is set to "1".

Subsequently, in S15, the numbers of images are compared with respect to the sheet SH1. The maximum number of images which can be arranged into the sheet SH1 is assumed to be "MAX". In this processing step, whether or not all of the images designated by the user can be arranged into the page to be printed at present is discriminated.

First, since the value itself of SHEET is equal to the number of pages of the sheet SH1, the product of the variable SHEET and the maximum number of images which can be arranged into the sheet SH1 is equal to the number of images which can be arranged into up to the last page of the sheet SH1. On the basis of such a value, whether or not IMAGE_NUM is greater than (MAX×SHEET) is discriminated. If IMAGE_NUM is greater than (MAX×SHEET), S16 follows. If IMAGE_NUM is smaller than (MAX×SHEET), S22 follows.

In S16, the images of the MAX number are printed to the last page of SHEET. The sheet SH1 is created by the images in a range from the image number [MAX×(SHEET−1)+1] to the image number (MAX−SHEET). In the case of printing the last page of the sheet SH1, the images of up to the (SHEET−1)th page have already been printed on the sheet SH1. The number of images in this instance is equal to [MAX×(SHEET−1)].

Therefore, the images in a range from the next image of [MAX×(SHEET−1)+1] to the image of (MAX×SHEET) as the maximum number+MAX of images which can be arranged into the sheet SH1 become the targets of the images which are printed to the last page of the sheet SH1. Therefore, the sheet SH1 is created by the images in the range from the image number [MAX×(SHEET−1)+1] to the image number (MAX×SHEET).

After the sheet SH1 is created in S16, the sheet SH1 is printed in S17. After the printing, the variable SHEET is incremented by "1" in S18.

Whether or not the user has selected that the sheet SH2 is printed (S4) is discriminated in S19. If the user has selected non-printing, the processing routine is returned to S15 in order to create the next sheet SH1.

If the user has selected "the sheet SH2 is printed", the sheet SH2 is created in S20. The information regarding the images used in the case of creating the sheet SH1 is obtained from the memory card 15 in S16. The sheet SH2 is created so that the relative positional relations on the sheet paper of the images in the sheet SH1 are identical.

In next step S21, the sheet SH2 created in S20 is printed onto the reverse side of the sheet SH1 printed in S17. If the recording unit 13 has an automatic duplex printing function, the sheet SH2 is automatically printed onto the reverse side of the sheet SH1 without intervention of the user.

If the recording unit 13 does not have the automatic duplex printing function, after the printing of the sheet SH1 is finished, a message for urging the user to turn the printed sheet SH1 upside down and set it is issued to the operation/display unit 8. It is sufficient that after the user set it, the printing of the sheet SH2 is started. It is also possible to print the sheets SH1 and SH2 onto different paper without duplex-printing them.

The processing routine is returned to S15 in order to subsequently create the sheet SH1.

If it is determined in S15 that IMAGE_NUM is smaller than (MAX×SHEET), in S22, the images of the sheet SH1 are formed by the images in a range from the image number [MAX×(SHEET−1)+1] to the image number IMAGE_NUM. The images in the last page of the sheet SH1 are formed in S22.

Therefore, the images of up to the (SHEET−1)th page have already been printed to the sheet SH1. Since the number of images is equal to [MAX×(SHEET−1)], the sheet SH1 in a range from the next image of [MAX×(SHEET−1)+1] to the number of designated images IMAGE_NUM is created. The creating operation of the sheet SH1 will be described in detail in FIG. 8. The sheet SH1 is printed in S23.

Subsequently, whether or not the user has selected "the sheet SH2 is printed" (S4) is discriminated in S24. If the user has selected the non-printing, the printing of the photo index sheet is finished. On the other hand, if the user has selected "the sheet SH2 is printed", the sheet SH2 is created in S25. The creating operation of the sheet SH2 will be described in detail in FIG. 9.

Finally, the sheet SH2 is printed and the printing of the photo index sheet is finished.

As mentioned above, in the printing of the sheets SH1 and SH2, the operations in which the user selects the images and selects whether or not the sheet SH2 is printed are inserted. Although the selection of the images is simplified as much as possible, there is still a possibility that it is troublesome to the user. Particularly, the complicated operation is necessary to print in accordance with his own will.

In the first embodiment, since a plurality of photo index sheets are printed, the maximum number of images which can be arranged into the photo index sheet is set to a reference and the pages of the photo index sheet are decided and printed. In the case of printing a plurality of photo index sheets, another method of printing a plurality of photo index sheets may be used.

Figure 8:
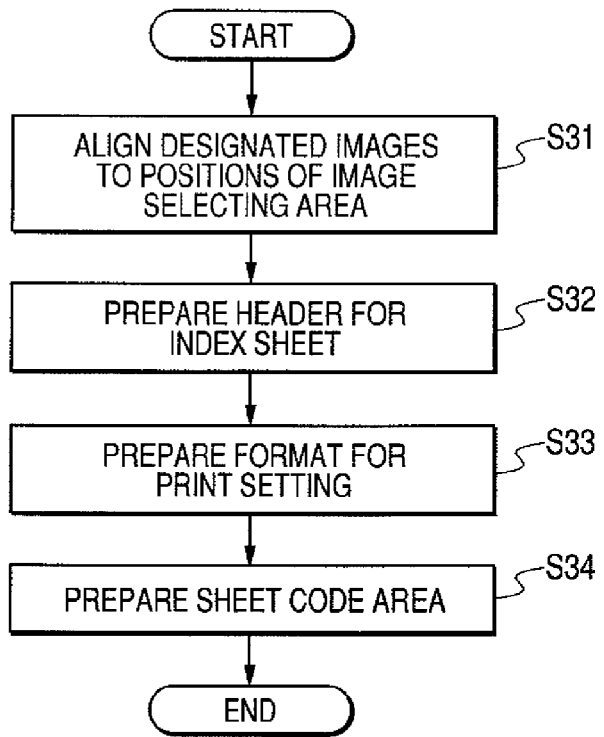
FIG. 8 is a flowchart showing the operation for creating images of the sheet SH1 in the first embodiment.

FIG. 8 is a flowchart showing the operation for creating the images of the sheet SH1 in the first embodiment.

When the sheet SH1 is printed, the designated ones of the images recorded in the memory card 15 are extracted and the images of the sheet SH1 are formed.

The images formed here are printed by the recording unit 13, thereby printing the sheet SH1.

First, in S31, the images of the sheet SH1 are formed so that the images designated as targets of the photo index sheet by the user are aligned to the positions of the image selecting area 44 of the sheet SH1 as shown in FIG. 3. In this instance, the layout of the images may be replaced by a layout other than the layout shown in FIG. 3.

A header portion of the sheet SH1 is prepared in S32. In this case, a title or the like of the sheet SH1 shown in FIG. 3 is indicated. Subsequently, a format for print setting is prepared in S33. The format for print setting is the mark area 41, 42, or 43 shown in FIG. 3 or the like. In this area, the user makes various settings such as print resolution, sheet size, and the like of the photo print.

In next S34, a sheet code 46 is prepared. This "sheet code area" is information in which the information regarding the images printed on the sheet SH1 have been embedded. The information embedded in the sheet code 46 is, for example, information showing in which range of the image numbers the images printed on the sheet SH1 have been embedded. The "image number" is the same as the image number added in S12.

The image forming operation when recording the images designated by the user onto the sheet SH1 is realized as mentioned above.

Figure 9:
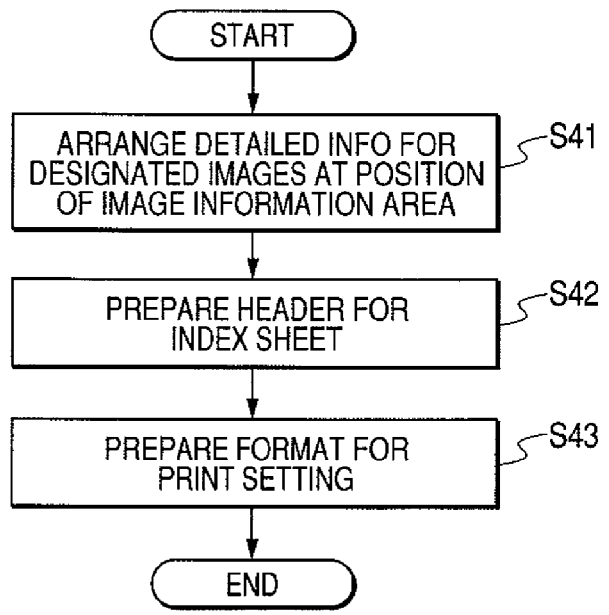
FIG. 9 is a flowchart showing the operation for creating images of the sheet SH2 in the first embodiment.

FIG. 9 is a flowchart showing the operation for creating the images of the sheet SH2 in the first embodiment.

First, in S41, the information of the images designated by the user as targets of the sheet SH2 is obtained from the memory card 15 and arranged at the position of the image information area 53 in the sheet SH2 shown in FIG. 4.

Subsequently, in S42, a header portion of the sheet SH2 is prepared. The header portion indicates a title or the like of the sheet SH2 shown in FIG. 4.

In S43, the format for detailed print settings of every image is prepared. This format is the mark area 51 or 52 shown in FIG. 4 or the like. In this area, the user makes various settings such as print resolution, sheet size, and the like every image of the photo print.

The sheet SH2 is created in this manner. In the layout shown in FIG. 4, the detailed information and the setting items of each image are arranged at positions similar to those in the relative positional relation on the paper surface on which the images of the sheet SH1 have been printed in a manner such that the user can intuitively and easily understand them. At this time, the layout of the detailed information and the setting items of each image may be replaced by a layout other than the layout shown in FIG. 4. For example, the numbers can be also unconditionally assigned to the setting items of each image of the sheet SH1 and each image of the sheet SH2, so that a free layout can be realized.

The sheet SH2 is created in this manner.

FIG. 10 is a flowchart showing the operation for scanning the photo index sheets and printing photographs in the first embodiment.

First, the multi-function apparatus 100 can print the photo index sheets by the method shown in FIG. 6. The user adds (paints) the marks to the images to be photo-printed in the photo index sheets. By reading the sheets SH1 and SH2 by the multi-function apparatus 100, the images can be photo-printed in the manner designated by the user.

First, in S51, it is recognized that the instruction to read the sheet SH1 has been executed through the operation/display unit 8 by the user. By this operation, the operation can be distinguished from the operation other than the instruction to read the sheet SH1, for example, from the simple copying operation.

Next, in S52, it is recognized that the memory card 15 has been connected to the multi-function apparatus 100. In S53, the operation is discriminated on the basis of a result of the recognition. If it is detected that the memory card 15 has been connected, the processing routine advances to S54. If the memory card 15 is not recognized, the occurrence of an error is displayed to the operation/display unit 8 and the processing routine is finished.

In S54, the reading unit 7 discriminates whether or not the sheet SH1 has correctly been placed. If the sheet SH1 is not correctly placed in the reading unit 7, since no information can be read, a message showing that the sheet SH1 cannot be read is displayed to the operation/display unit 8 and the processing routine is finished.

If the sheet SH1 has correctly been placed in S54, S55 follows. Although whether or not the sheet SH1 has correctly been placed is discriminated by the reading unit in the first embodiment, such a discrimination can be also made by means other than the reading unit 7.

In S55, the positions of the marks arranged in the mark areas 41, 42, 43, and 45 of the sheet SH1 placed in the reading unit 7 are analyzed.

In the sheet SH1, since the mark positions arranged in the mark areas 41, 42, 43, and 45 have been predetermined, whether or not the marks have been painted by the user can be discriminated from the read data. Therefore, data showing the mark areas painted by the user is obtained on the basis of the data read by the reading unit 7. After the data showing the marks painted by the user was obtained, whether or not the user has selected the operation to read the sheet SH2 in S4 is discriminated in S56.

If the user has selected "the sheet SH2 is not read", a process of S57 is executed. In S57, the data corresponding to the positions painted in the mark areas 41, 42, 43, and 45 of the sheet SH1 is obtained. The set values for photo-printing, the images to be printed, the number of images to be printed, and the like are set on the basis of the obtained information. The photographs are printed in S58.

If the user has selected "the operation to read the sheet SH2" in S56, the sheet SH2 printed on the reverse side of the sheet SH1 is read in S59. The positions of the marks arranged in the mark areas 51 and 52 and the image information area 53 of the sheet SH2 are analyzed. In the sheet SH2, since the mark positions arranged in the mark areas 51 and 52 and the image information area 53 have been predetermined, whether or not the marks have been painted by the user can be discriminated on the basis of the read data. Therefore, data showing the mark areas painted by the user is obtained on the basis of the data read by the reading unit 7.

In this instance, if the reading unit 7 has an automatic duplex reading function, the operation as mentioned above is executed. However, if the reading unit 7 does not have the automatic duplex reading function, a message showing that the sheet SH2 is set to the reading unit 7 is displayed to the operation/display unit 8, thereby instructing the user to set it.

Subsequently, in S60, the data corresponding to the positions of the marks painted in the mark areas 41, 42, 43, and 45 of the sheet SH1 is obtained.

Subsequently, the data corresponding to the positions of the marks painted in the mark areas 51 and 52 and the image information area 53 of the sheet SH2 is obtained.

The set values for photo-print, the images to be printed, the number of images to be printed, and the like are set on the basis of the information obtained from the two sheets SH1 and SH2. The photographs are printed in S61.

If both of the mark areas 41 and 51 have been painted, the print setting values are set in accordance with the marks of the mark area 51 with respect to the images marked in the mark area 51. The print setting values set in the mark area 41 are set with respect to other images.

If the mark area 42 is not painted, with respect to the images marked in the mark area 52, its optional correction is made. On the contrary, if the mark area 42 has been marked, with respect to the images marked in the mark area 52, its optional correction is not made.

If the mark area 43 has been marked, the setting is made so as to print all of the images one by one irrespective of the number of print copies designated in the mark area 45 or the image information area 53. If the mark area 43 is not marked, the printing of the images of the number designated in either the mark area 45 or the image information area 53 regarding one image is set. If two or more positions have been marked in the mark area 45 or the image information area 53 regarding one image, those images are not printed.

Although the control is made in accordance with the marks in the mark areas 41, 42, 43, 45, 51, and 52 and the image information area 53 in the embodiment, many other methods are considered. For example, it is also possible to construct in such a manner that even if both of the mark areas 42 and 52 have been marked, the optional correction is executed. If a plurality of positions have been marked in both of the mark area 45 and the image information area 53 regarding one image, it is also possible to set so as to print the images of the total number obtained by adding the values written in the marked positions.

By using the mark areas 41 and 51, it is necessary to change the sheet size/type every image to be printed. As a method of realizing such a process, it is preferable to use a method whereby the multi-function apparatus 100 has a plurality of sheet trays (not shown), the sheets of the number set in the mark areas 41 and 51 are fed from those sheet trays, and the recording unit 13 prints the images to those sheets. If the multi-function apparatus 100 does not have a plurality of sheet trays, it is preferable to use such a method that each time one printing is finished, the sheet to be subsequently set is displayed to the operation/display unit 8, thereby allowing the user to set them.

According to the first embodiment, since the user uses the sheets SH1 and SH2, the complicated operation similar to that in the conventional method is not executed but the user can paint the marks prepared at the predetermined positions of the sheets with reference to the detailed information every image. Merely by reading the sheets, the detailed setting of each image can be made.

According to the first embodiment, in the case where the user prints the photographs by using the photo index sheets as in the conventional manner, he can freely set only the number of print copies of each image by using the sheet SH1. The same settings can be made to all of the images to be printed with respect to the sheet size, the sheet type, and the options about the image processes such as addition of the date, VIVID-photo, noise cancellation, automatic photograph correction, face-brightening correction, red-eye correction, and the like.

According to the first embodiment, if the user desires to set every image with respect to not only the number of print copies but also the sheet size, the sheet type, and the options about the image processes, and the like, it is sufficient to set them by using the sheet SH2.

The user can set in detail every image by using the sheet SH2 with reference to the detailed information of each image.

According to the first embodiment, by printing the sheet SH2 to the reverse side of the paper on which the sheet SH1 has been printed, a consumption amount of the sheets by the user can be reduced into the half.

Further, according to the first embodiment, the information of each image on the sheet SH1 and the information of each image on the sheet SH2 as a reverse side are made identical and the relative positional relations of the setting items on the paper surface are also made identical. By arranging the images in this manner, the index sheets with high usability in which it is easy for the user to understand the relation between the information of both of the obverse and reverse sides can be realized.

According to the first embodiment, with respect to the setting items such as sheet size, sheet type, and the like written on both of the sheets SH1 and SH2, the set values selected in the sheet SH2 are preferentially used. Therefore, with respect to the sheet size and the sheet type which the user wants to set most frequently among the images to be printed, they are selected in the sheet SH1, while with respect to the minor setting items which the user wants to individually select, they can be selected in the sheet SH2.

According to the first embodiment, with respect to the items of the options about the image processes or the like written on both of the sheets SH1 and SH2, it is also possible to construct in such a manner that if the items in both of the sheets have been marked, the image correction about such images is not executed. In this case, for example, if the user wants to prepare the dates to almost of the images but does not want to prepare the date only to one image, the date column in the sheet SH1 is not marked. The date column in the sheet SH2 is marked only to the images to which the user does not want to prepare the date. Thus, the desired operation can be made operative.

On the contrary, if the user wants to prepare the date only to one image, it is sufficient that the mark is not prepared to the date column in the sheet SH1 but the date column is marked in the sheet SH2 only to the images which the user wants to prepare the date. Thus, a desired operation can be made operative.

According to the first embodiment, with respect to the items written on both of the sheets SH1 and SH2, since various using methods are considered every item, the index sheets with high usability can be realized.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application NO. 2005-378625, filed Dec. 28, 2005, which is hereby incorporated by reference herein in its entirety.

What is claimed is:

1. An information processing apparatus comprising:
    an inputting unit configured to input a first output condition which can be set collectively to a plurality of images to be output and to input a second output condition which can be designated by a user to each of the plurality of images individually, according to an instruction by the user;
    a specifying unit configured to specify, from the plurality of images, one or more designated images to which the second output condition input by the inputting unit is designated individually, and to specify one or more remaining images of the plurality of images except for the one or more designated images;
    a setting unit configured to set the second output condition designated to each of the one or more designated images specified by the specifying unit, individually, to each of the one or more specified images, and to set the first output condition, collectively, to each of the one or more remaining images specified by the specifying unit; and
    an outputting unit configured to output the one or more designated images specified by the specifying unit according to the second output condition set by the setting unit, and to output the one or more remaining images specified by the specifying unit according to the first output condition.

2. An apparatus according to claim 1, further comprising a selecting unit configured to select the plurality of images, according to an instruction by a user, wherein the setting unit sets the first output condition or the second output condition to each of the plurality of images selected by the selecting unit.

3. An apparatus according to claim 1, wherein the outputting unit causes a printing apparatus to print the plurality of images.

4. An apparatus according to claim 1, further comprising a second print control unit configured to cause a printing apparatus to print an image for setting the first output condition and the second output condition, on at least one sheet; and
    an acquiring unit configured to acquire read image data obtained by reading, by a reading apparatus, of the at least one sheet printed by the second print control unit, wherein the inputting unit inputs the first output condition and the second output condition, based on the read image data acquired by the acquiring unit.

5. An information processing method executed by an information processing apparatus, the method comprising:
    at least one processor of the information processing apparatus performing the steps of:
    (a) a first inputting step of inputting a first output condition which can be set collectively to a plurality of images to be output, according to an instruction by a user;
    (b) a second inputting step of inputting a second output condition which can be designated by a user to each of the plurality of images individually, according to an instruction by the user;
    (c) specifying, from the plurality of images, one or more designated images to which the second output condition input by the second inputting step is designated individually, and to specify one or more remaining images of the plurality of images except for the one or more designated images;
    (d) setting the second output condition designated to each of the one or more designated images specified by the specifying step, individually, to each of the one or more specified images, and setting the first output condition, collectively, to each of the one or more remaining images specified by the specifying step; and
    (e) outputting the one or more designated images specified by the specifying step according to the second output condition set by the setting step, and outputting the one or more remaining images specified by the specifying step according to the first output condition.

6. A non-transitory computer-readable storage medium storing a computer-executable program comprising:
    a first inputting step of inputting a first output condition which can be set collectively to a plurality of images to be output, according to an instruction by a user;
    a second inputting step of inputting a second output condition which can be designated by a user to each of the plurality of images individually, according to an instruction by a user;
    specifying, from the plurality of images, one or more designated images to which the second output condition input by the second inputting step is designated individually, and to specify one or more remaining images of the plurality of images except for the one or more designated images;
    setting the second output condition designated to each of the one or more designated images specified by the specifying step, individually, to each of the one or more specified images, and setting the first output condition, collectively, to each of the one or more remaining images specified by the specifying step; and
    outputting the one or more designated images specified by the specifying step according to the second output condition set by the setting step, and outputting the one or more remaining images specified by the specifying step according to the first output condition.

* * * * *